US006114649A

United States Patent [19]

Delcea

[11] Patent Number: 6,114,649

[45] Date of Patent: Sep. 5, 2000

[54] ANODE ELECTRODE FOR PLASMATRON STRUCTURE

[75] Inventor: Lucian Bogdan Delcea, Port Coquitlam, Canada

[73] Assignee: Duran Technologies Inc., Port Coquitlam, Canada

[21] Appl. No.: 09/353,036

[22] Filed: Jul. 13, 1999

[51] Int. Cl.[7] .................................................. B23K 10/00

[52] U.S. Cl. .................................. 219/121.52; 119/121.5; 119/75; 313/231.31

[58] Field of Search .......................... 219/74, 75, 121.36, 219/121.52, 121.5, 121.51, 121.59, 121.48; 313/231.31, 231.41

[56] References Cited

U.S. PATENT DOCUMENTS

| | | | |
|---|---|---|---|
| 3,140,380 | 7/1964 | Jensen . | |
| 3,312,566 | 4/1967 | Winzeler et al. . | |
| 3,770,935 | 11/1973 | Tateno et al. . | |
| 4,317,984 | 3/1982 | Fridlyand . | |
| 4,506,136 | 3/1985 | Smyth et al. | 219/121.48 |
| 4,661,682 | 4/1987 | Gruner et al. . | |
| 4,780,591 | 10/1988 | Bernecki et al. . | |
| 4,788,402 | 11/1988 | Browning . | |
| 4,841,114 | 6/1989 | Browning . | |
| 4,882,465 | 11/1989 | Smith et al. . | |
| 4,916,273 | 4/1990 | Browning . | |
| 4,958,057 | 9/1990 | Shiraishi et al. | 219/121.5 |
| 4,970,364 | 11/1990 | Müller . | |
| 5,008,511 | 4/1991 | Ross . | |
| 5,225,652 | 7/1993 | Landes . | |
| 5,296,668 | 3/1994 | Foreman et al. . | |
| 5,332,885 | 7/1994 | Landes . | |
| 5,420,391 | 5/1995 | Delcea . | |
| 5,514,848 | 5/1996 | Ross et al. . | |
| 5,556,558 | 9/1996 | Ross et al. . | |
| 5,637,242 | 6/1997 | Muehlberger . | |
| 5,837,959 | 11/1998 | Muehlberger . | |
| 5,900,272 | 5/1999 | Goodman . | |

FOREIGN PATENT DOCUMENTS 1623846 1/1991 U.S.S.R. .

OTHER PUBLICATIONS

Miller Thermal Inc.–Section 5–Parts List, Model SG–100 pp. 37–46.

A.V. Donskoi, V.S. Klubnikin–Electro Plasma Processes and Apparata, 1979 Leningrad Publishing House.

*Primary Examiner*—Mark Paschall
*Attorney, Agent, or Firm*—Bull, Housser & Tupper

[57] ABSTRACT

A plasmatron operating efficiently within a wider range of gas flows and capable of sustaining a stable arc voltage. The plasmatron generates an electric arc at the tip of a cathode electrode and transfers the arc along an arc chamber and into the bore of an anode electrode located at the downstream end of the arc chamber. A plurality of arc root attachment surfaces are defined on an inner surface of the anode by a plurality of ring members, causing the electric arc to attach with its root to the arc root attachment surfaces and therefore the axial movement of the arc root is confined substantially to the anode electrode. The arc voltage variations are limited and controlled substantially by the arc root movement between two adjacent arc root attachment surfaces. When used within a plasma-spraying torch, the plasma stream generated by the plasmatron has improved characteristics and induces improved plasma spray coatings.

16 Claims, 3 Drawing Sheets

ANODE ELECTRODE FOR PLASMATRON STRUCTURE

FIELD OF THE INVENTION

This invention relates to a plasmatron structure comprising an arc root stabilizing anode electrode capable of operating at higher rising volt-ampere characteristic and reduced gas flow to power ratio wherein the arc is transferred from a cathode tip to a remote downstream anode bore and the arc root attachment is stabilized to the anode bore. The stabilization and the control of the arc root attachment to the anode bore enables to achieve a stable arc voltage operation for extended arcs, variable gas flow rates, gas pressure and power applications, therefore producing a plasma stream with superior parameters.

BACKGROUND OF THE INVENTION

Plasmatrons use an electric arc to generate a stream of high temperature gas and are currently used in many applications, including the attachment to various plasma torch and plasma nozzle configurations used for plasma spraying. In a plasmatron, a plasma forming gas flows through an arc chamber and a plasma stream is generated by an electric arc formed between a cathode and an anode generally located at the opposite sides of the arc chamber. In prior art designs, the arc root attachment and the plasmatron operating stability are dependent upon the plasma gas flow rate, gas pressure or electrical power operation. In practical use of plasmatrons, the gas flow rate, gas pressure or electrical power conditions do vary accidentally. Such accidental variations induce uncontrolled changes in the properties of the plasma stream.

Generally, a constant gas flow rate through the plasmatron has to be controlled as means to maintain a stable arc length and avoid excessive arc root fluctuations. However, in practice, even when the plasma gas flow is strictly controlled, the arc root displays occasional and unpredictable longitudinal excursions with deleterious effects for the application of the plasma torch.

It is known that the use of high voltage-low amperage arcs to operate a plasma torch has certain advantages in terms of reduced electrode wear and improved thermal efficiency of the torch. Since Ohm's law apply to a plasma stream, in order to increase the voltage of the arc the experimenter can use various means such as: (a) increase the electrical resistivity of the plasma gas by increasing the pressure, by increasing the gas flow, by using plasma gasses with higher electrical resistivity or by constricting the plasma gas flow, (b) extend the length of the arc.

The influence of arc channel diameter on the electric field is described by the $K_E$ criterion as derived from Ohm's law:

$$K_E=(\sigma\times E\times d^2)\times I^{-1}$$

where:
"E" is the electric field strength, "d" is the diameter of the arc channel, "I" is the arc current and "σ" is the specific electrical conductance of the plasma gas.

The electric field dependents exponentially with the diameter "d" as it varies with its square power. Theoretically, a long and narrow arc channel should lead to higher arc voltages. The practical impediment is to prevent the arc from attaching randomly to the internal wall of the channel or from random axial excursions of the arc root. The axial excursions can be partially reduced by increasing the gas flow or gas pressure and shortening the arc length. This would be uneconomical and to the detriment of plasma torch efficiency. Another practical impediment relates to maintaining a stable arc root attachment and therefore a stable arc length when water-cooling, plasma gas flow, plasma gas pressure or the power application vary either accidentally or on purpose by the torch operator.

An approach to control the arc root attachment within a straight plasma duct is found in U.S. Pat. No. 4,841,114 and U.S. Pat. No. 4,916,273 of Browning. Browning discloses a singular surface discontinuity formed at a downstream position along a constant cross-section anode nozzle bore, the discontinuity being in the form of a groove, an annular shoulder, a counterbore or an output shoulder. The discontinuity is meant to prevent the migration of the arc root towards the end of the anode nozzle exit and to induce wear of the anode nozzle exit. It is apparent that this design operates at significantly higher gas flow rates. The high gas flow pushes the arc forward therefore extending the arc linearly while the discontinuity is claimed to prevent the arc root attachment from migrating further downstream of the discontinuity. The attachment of the arc root in a surface groove as shown in Browning, if that is even possible, may in itself lead to unpredictable instabilities associated with the gas turbulence developed within the groove channel. Variations in the cooling rate of the anode nozzle bore or variations in the gas flow rate may easily determine the arc root to escape the effect of the discontinuity and therefore migrate substantially along the axis, even if only for a short time. Such instabilities affect the parameters of the plasma stream, which then will affect negatively the quality and repeatability of the plasma sprayed coatings. The high gas flow rates required to operate the Browning designs will induce high operating costs of the plasma spray torch.

A different approach to control arc root attachment to a remote annular and smooth anode is found in U.S. Pat. No. 5,332,885 of Landes which discloses a plurality of cathodes generating a plurality of arcs within a common arc chamber, the arcs attaching to a common anode bore. An intermediate section comprises a plurality of electrically neutral annular rings, which Landes refers to as "neutrodes". The apparatus disclosed by Landes is very complicated and the plurality of arcs will interfere with each other resulting in an unstable torch operation. Even if Landes used only one cathode, when an ionized plasma is generated, the neutrode rings act as electric capacitors therefore attaining an electric charge on their inner surface. This results in arching to the rings due to secondary electrode effect, therefore deleteriously affecting the functioning of the plasmatron. A similar approach towards the use of electrically floating segmented anodes is described in U.S. Pat. No. 5,900,272 of Goodman.

U.S. Pat. No. 5,296,668 of Foreman et al. teaches a gas cooled cathode, electrically insulated by means of an insulating collar and operating in conjunction with an elongated and smooth anode tube having a small conical entrance portion. This design also relies on the gas flow rate and sufficient cooling of the anode nozzle bore to push the arc and force a downstream migration and a random attachment of the arc root. There are no provisions to stabilize the arc root location and the arc root will migrate longitudinally without any means to control it effectively.

Other prior art discloses the use of gas flow constrictors to increase gas resistivity and raise the arc voltage as well as the use of electrically insulating sleeves within the arc chamber to extend the arc and avoid arching to the chamber wall. Such prior art is found in U.S. Pat. No. 4,882,465 of Smith et al., U.S. Pat. No. 5,008,511 of Ross, U.S. Pat. No. 5,420,391 of Delcea, and U.S. Pat. No. 5,514,848 of Ross et al. Identical arc constrictor like that disclosed by Ross et al. is also disclosed in Soviet Union Patent SU No. 1623846 of Granovski wherein the arc is pushed by the gas through the constrictor and is transferred to the workpiece which is positively biased. U.S. Pat. No. 4,317,984 of Fridlyand discloses a plasma torch apparatus comprising a plasmatron method whereby an arc generated at the cathode tip is pushed through a first constrictor located close to the cathode tip and is transferred further to an anode counterbore positioned downstream of a second constrictor. This arrangement functions only with additional plasma trimmer or support gasses which are introduced in the annular space between the first and the second constrictors, therefore it is too complicated and without any apparent benefit to stabilizing the arc root attachment. Both constrictors disclosed by Fridlyand have relatively large cross-section and function as means to transfer the arc into the counterbore by acting mainly as arc column guides.

Smith, Ross et al., Delcea and Granovski disclose the general use of constrictors in the gas flow passage with the gas flow acting to effectively push the electric arc through the throat of the constrictor. This leads to a reduction in the amperage to voltage ratio (A/V) of less than it would be desirable and further, the designs are sensitive to variations in the gas flow. In Ross et al. and in Delcea the arc is pushed through the throat of the constrictor by the velocity of the gas sufficiently to pass through the throat and to attach to a smooth cylindrical surface of an anode electrode, positioned relatively shortly downstream of the exit of the constrictor. In order to achieve this effect, a high ratio of gas flow to power application would be necessary to prevent arc attachment to the constrictor and fluctuations in the torch electrical operation. The arc root is left to fluctuate axially in an uncontrolled and unpredictable manner. In Ross et al. the stable functioning is disclosed as being dependent on the given power application to the electrodes and the work parameters of the electrode structure will therefore vary with any variations in the power application while theoretically, the arc voltage attainable by such a design is expected to be significantly below 200V.

The inventor found that the gas flow to power ratio is an important parameter of a plasmatron, particularly when used for plasma spraying. This parameter is indicative of enthalpy or in other words the heat content per unit of plasma gas, measured for example in kJ/mole of gas. The higher the enthalpy, the more heat is available in the plasma gas to melt the powder. When low plasma gas flows are used in conjunction with a high voltage-high power arc, higher enthalpy plasma streams are generated, and superior coatings can be plasma sprayed. The difficulty in generating a stable high arc is not with respect to stretching and constricting the arc which are readily achievable by the appropriate shape and length of the arc chamber wall, instead, the difficulty is in maintaining a stable arc length and controlling the axial movement of the arc root attachment.

The prior art offers only a limited degree of control over the arc length stability and are therefore subject to unpredictable arc root longitudinal excursions. In the prior art designs, the gas flow rate and power application to the plasmatron play a significant part in controlling both the arc length and the amperage to voltage ratio as well as to prevent the excessive axial movement of the arc root on the anode surface. In addition, the high gas flow to power ratios required to operate prior art plasmatrons lead to lower enthalpy and lower plasma spray efficiency.

There are plasma spray torches claimed to apply a plasma spray coating inside of small diameter pipes wherein a very short plasma arc is generated between a cathode tip and the nozzle bore. Such prior art plasma torches generate a low voltage, low power and weakly ionized plasma stream into which the powder is injected and therefore are known to be very inefficient. Examples are found in U.S. Pat. No. 4,970,364 of Muller, U.S. Pat. No. 4,661,682 of Gruner et al. and U.S. Pat. No. 5,837,959 of Muelberger et al. It would be desirable to employ the use of a higher ionized plasma stream to improve coating quality. Whenever such plasma spray torches require a plasma of larger magnitude than the plasma generated by one plasmatron, a desired plurality of plasmatrons can be arranged within a single plasma torch apparatus which combines the pluralities of plasmas into a single applicable plasma stream. Examples are found in U.S. Pat. No. 5,008,511 of Ross, U.S. Pat. No. 3,140,380 of Jensen, U.S. Pat. No. 3,312,566 of Winzeler et al. and U.S. Pat. No. 5,556,558 of Ross et al. A schematic example of such multiple use of plasmatrons in converging relationship is also found at page 31 of a Russian Book by Donskoi et al., Leningrad, 1979. Patent '511 teaches the use of "C" shaped and "D" shaped cross-sections applicable to a plurality of plasma channels converging into a common plasma spray output nozzle.

The majority of plasma spray apparatuses inject plasma spray material in a plasma stream exhibiting little or no ionization. The only apparatus which apparently could generate a somehow higher ionized plasma stream is disclosed in the cited prior art by Browning. However, Browning claims that the method and apparatus thereof is meant to inject powder into the hot gas exhibiting no ionization. U.S. Pat. No. 4,788,402 of Browning, teaches the benefits of injecting spray material into an expanded ionized flame but the apparatus described therein uses tremendously high quantities of expensive plasma gas at a very high pressure of about 170 lb/in$^2$ (~1,200 kPa), while attaining an optimum working arc voltage of only 180–190V. These working conditions are not adequate to induce sufficient gas ionization of the second degree and an enhanced plasma enthalpy. The arc root attachment in patent '402 is pushed downstream by the very high gas flow and locates on the output lip of the plasma nozzle. It is well known that this arc attachment leads to a rapid deterioration of the nozzle output and practical experience has proven that in this situation, the arc is very unstable, often exiting the nozzle bore to attach on the front face of the plasma torch. Another disadvantage of the method in patent '402 is the very narrow margin of error with respect to optimum operating gas flow as disclosed therein, therefore indicating that this design operates only with a very high gas flow, which must also be strictly controlled within restrictive limits. An example of how the use of high gas flows and gas pressures can lead to a low ionized, low temperature plasma despite higher arc voltages is found in U.S. Pat. No. 5,637,242 of Muehlberger where a plasma stream temperature reported to be in the 3000° K. range is practically insufficient to ionize sufficiently the plasma gas and to transfer adequate heat to the powder particles. This is a serious disadvantage for spraying high melting point materials such as ceramics. For example, the thermal conductivity of a nitrogen plasma, in other words plasma capacity to transfer heat and melt the powder particles is about 0.45 W/m° K. at 3000° K., about 2.8 W/m° K. at 6000° K. and about 5.3 W/m° K. at 7000° K.

It has been found by the applicant without having a complete explanation, that superior plasma spray coatings can be produced when the feedstock material is injected into a sufficiently ionized region of a plasma stream and is then confined to travel sufficiently through such an ionized region. The enhanced ionization is visible as a flame of higher intensity and a stream of powder spray material brighter than normal is projected through the plasma stream, this being indicative of superior heating and melting of the powder. It is believed that the higher arc voltage (higher than 120V and typically in the range of 200–500V) applied to lower gas flows crosses the threshold necessary to induce an enhanced plasma gas ionization of the second degree, sufficient to expand considerably the second degree ionized region of the plasma stream. Thus, a hotter plasma stream is generated with an estimated average temperature significantly in excess of 3000° K. and typically higher than 5000° K. Consequently, when such a plasma stream is used with a plasma spray torch, the melting of the powder material injected into a sufficiently ionized plasma stream having an enhanced enthalpy is superior to prior art plasma spray torch methods and apparatuses. mainly due to the increased heat transfer to the powder, particularly resulted from enhanced exhotermic ionic recombinations of the second degree.

It would be therefore desirable to provide a plasmatron capable of operating with a stable arc at higher voltages while using lower gas flows or gas pressures and therefore inducing higher plasma enthalpy and plasma stream temperature. It would also be desirable to provide a plasmatron generating a stable arc by controlling the arc root location on the anode electrode, with reduced influence by gas flow, gas pressure, or electrical fluctuations. It would be further desirable to provide a plasmatron operating optimally with a stable electric arc within a wider range of gas flows, gas pressures and power applications. All the above requirements for a superior plasmatron would be fulfilled if the anode arc root attachment is stabilized to the anode and the voltage fluctuations occur within controlled limits

SUMMARY OF THE INVENTION

It is the object of this invention to provide a superior anode structure that stabilizes the arc root attachment to the anode bore and controls the voltage fluctuations.

It is further the object of the present invention to provide a superior plasmatron for attachment to plasma torches, including plasma spray torches capable of operating stable at reduced gas flow to power ratios and at higher rising volt-ampere characteristic, thereby generating an extended and stable transferred arc to produce a higher ionized plasma stream.

The present invention relates to a superior anode electrode structure for use in a plasmatron, the anode comprising a plurality of surface rings separated by annular grooves shaped into the anode bore, the grooves being of sufficient depth and width functions to disturb the boundary layer and to create sufficient turbulence to cause the arc to attach to the anode bore, substantially on the inner surface of the bore extending between two consecutive grooves, and to prevent the arc root from migrating past either of the upstream or the downstream rings, thus stabilizing the arc length and confining its root attachment within the anode electrode bore.

The present invention further relates to a plasmatron having a longitudinal axis and comprising a cathode and the anode electrode, the cathode and the anode disposed axially at the opposite ends of an arc chamber having an inner wall, the cathode and the anode being spaced apart longitudinally and electrically insulated from each other and used to form an electric arc to generate a plasma stream moving in the chamber in the direction of the anode electrode. The plasma stream generated by the plasmatron is discharged at the downstream end of the anode electrode. A gas passage extends axially from around the cathode electrode to the downstream exit of the plasmatron, the internal wall of said gas passage substantially defining the inner wall of the arc chamber. Plasma forming gas flows through the arc chamber in he direction of the anode. An electric potential is applied between the cathode and he anode, sufficient to ignite and maintain an electric arc generated at the tip of the cathode. The electric arc stretches along the arc chamber and is transferred to the anode bore. A plurality of surface rings separated by annular grooves are shaped into the anode bore, the grooves being of sufficient depth and width functions to disturb the boundary layer and to create sufficient turbulence to cause the arc to attach to the anode bore, substantially on the inner surface of the bore extending between two consecutive grooves, and to prevent the arc root from migrating past either the upstream or the downstream rings, thus stabilizing the arc length and confining the movement of its root attachment to the anode electrode bore.

Gas flow and arc guiding surfaces may be shaped into the arc chamber inner wall to determine and control the length and shape of the electric arc, thereby establishing a continuous arc column transferred from the cathode tip to the anode electrode bore. The electric arc having its root stabilized to the anode is capable of generating a plasma stream with superior thermal-dynamic properties such as reduced voltage ripple, higher enthalpy and higher thermal-conductivity.

One field of application for the plasmatron of the present invention is plasma spraying. Output plasma nozzles may be therefore provided to receive the plasma stream discharged at the output of the plasmatron and feedstock supply ducts may also be provided to discharge feedstock into the plasma stream flowing through the output plasma nozzle. The feedstock is transferred improved heat and momentum and is further impacted onto a surface to produce improved plasma sprayed coatings.

BRIEF DESCRIPTION OF THE DRAWINGS

Further features and advantages will be evident from the following detailed description of the preferred embodiments of the present invention and in conjunction with the accompanying drawings in which:

in FIG. 6A powder is fed internally into a straight plasma nozzle; in FIG. 6B powder is fed externally into same type of nozzle, while FIG. 6C and FIG. 6D show alternate ways of feeding powder into a plasma-deflecting nozzle.

DETAILED DESCRIPTION

For simplicity purposes, water cooling means and other conventional plasma torch engineering means have been purposely eliminated in all the figures herein.

Figure 1:
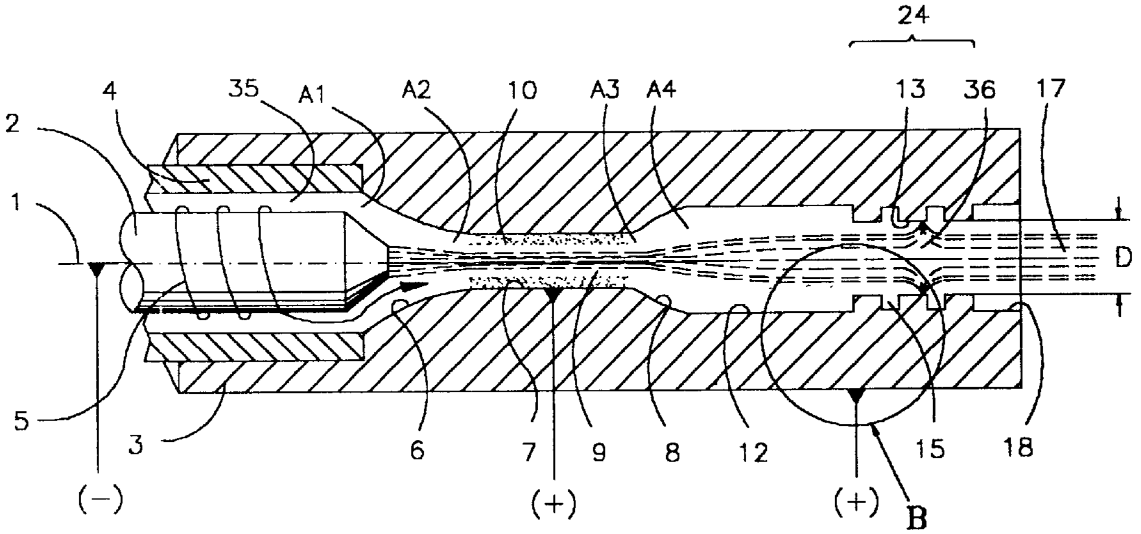
FIG. 1 is a schematic front elevation view of the plasmatron and the anode of the present invention shown in cross-section.

Referring initially to FIG. 1 of the drawings a plasmatron indicated generally at body 3 is shown having a longitudinal axis 1. Plasmatron 3 has a longitudinal cavity extending from the upstream end to the downstream end of the plasmatron housing, the cavity and the surface elements thereto defining the inner wall of an arc chamber. Cathode 2 is located axially at the upstream end of the plasmatron and is shown surrounded by an electrically insulating material such as a collar or a sleeve, to prevent arching to the adjacent chamber wall. The cathode tip is made of a material with a surface work function sufficient to maintain a stable arc through enhanced thermo-ionic emission of electrons. Conventional materials for the cathode include doped tungsten, zirconium, hafnium or graphite. A plasma gas flow is supplied from an external source and is forced to flow in a vortex 5 through the annular space 35 defined by cathode 2 and insulating collar 4 and to flow further through the entire length of the arc chamber in the direction of anode 24. Conventional means of inducing the gas vortex are disclosed by cited prior art in Smith, Delcea and Ross et al. Other conventional means of inducing the gas vortex are disclosed in the parts list for Model SG-100 plasma torch released by Miller Thermal Inc. and are in the form of an electrically insulating collar comprising a plurality of gas channels angled in a swirling relationship to create a plasma gas vortex around the cathode tip.

When a constricted arc is required, the internal surface of collar 4 merges into a convergent diffuser 6. Diffuser 6 is shaped to compress the gas and preserve the vortex thus preventing the arc from attaching to the surface of diffuser 6. To reduce flow energy losses commonly induced by the gradual flow contraction associated with convergent diffusers, the cross-sectional area ratio ($AR=A_2/A_1$) of diffuser 6 is recommended to be between about 0.25–0.80.

Diffuser 6 merges smoothly into surface element 7 shaped as cylindrical throat 9. Preferably, surface 7 is maintained sufficiently cool to generate and to maintain a gas boundary layer 10, sufficiently cold and with sufficient thickness, electrical resistance and uniformity to prevent the arc from attaching to surface 7 except at start-up. Throat 9 is dimensioned to cause a laminar gas flow within the throat, substantially without gas swirling, therefore the boundary layer 10 is preferably and substantially determined by the gradient in gas viscosity due to the laminar gas flow without vortex. A region of the gas about the axis is heated by the arc creating a high temperature and high-pressure core increasing the arc voltage and aiding the downstream extension of the arc column. The advantage of this design is that when used with an elongated transferred arc, the ionization of the plasma gas begins earlier in the high pressure, high-temperature core rather than in the vicinity of the anode, therefore leading to an enhanced overall gas ionization. For laminarity conditions, the throat length to diameter ratio of throat 9 is in the range of 0.5–3.5 to 1.

A divergent diffuser 8 may be connected to the downstream end of throat 9 opening into a flow expansion chamber 12. Chamber 12 extends axially to the anode electrode 24. The bore diameter "D" of anode electrode 24 is equal to or larger than that the diameter of throat 9. The ratio of the anode diameter "D" to the diameter of throat 9 will preferably be in the range of 1–4 to 1. Preferably, the divergent diffuser 8 is dimensioned to avoid or minimize the shock disturbance associated with the transition from supersonic to subsonic flow or alternatively in case of lower, subsonic gas flows, to enhance the pressure loss recovery and to reduce the flow stagnation associated with a rapid decrease in subsonic gas flow velocity through such divergent diffusers. When used with various gas flows, divergent diffuser 8 induces a smooth transition of the gas flow from throat 9 into gas flow expansion chamber 12 inducing an efficient transfer of the electric arc from the cathode tip directly into the anode bore 24. The cross-sectional area ratio ($AR=A_4/A_3$) of diffuser 8 is usually between about 1.1–3.0. The combination of converging—diverging diffusers associated with the presence of an electrically insulating gas boundary layer and a positive electrical bias applied to said combination, performs as an intermediate nozzle electrode which accelerates the electrons in the electric arc, therefore projecting the electrons with high energy in the downstream direction. However, when the approach to arc constriction and stretching described above is used in conjunction with prior art anode electrodes, the arc is highly unstable and often migrates to attach instantly to the surface of throat 9 or diffuser 8, resulting in rapid malfunctioning of the plasmatron and the issuance of an inconsistent plasma stream.

Figure 2:
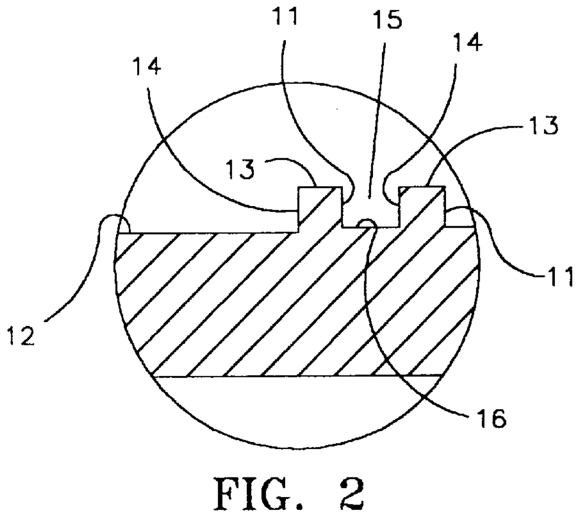
FIG. 2 is a scaled up view of the cross-sectional area within circle "B" in FIG. 1.

With reference to FIG. 1 and FIG. 2, a superior anode electrode 24 is shown having an inner surface of diameter "D". A plurality of arc root attaching surfaces 13 are defined on the inner surface of the anode electrode by a pair of adjacent ring members 11 and 14. Surfaces 13 are separated by grooves 15 shaped radially into the anode electrode. Each groove 15 is defined by a pair of adjacent ring members 11 and 14 extending radially about the inner surface of the anode and by a groove bottom member 16. During plasmatron operation, the arc root 36 attaches to an arc root attachment surface 13 and may jump over one groove, therefore moving axially between two adjacent surfaces 13 but without migrating beyond the upstream or the downstream rings. Preferably, grooves 15 and surfaces 13 shall be provided with sufficient depth and width functions so that for a chosen electric power and gas flow ratio, an axial movement of the arc root 36 between two adjacent surfaces 13 to result in a voltage variation of significantly less than 10V. Depending on the gas flow magnitude and the desired arc length, the ratio of the widths of surface 13 and groove 15 is between 1–5 to 1. The downstream end of anode electrode bore 24 may be in effect the exit of the arc chamber. In order to facilitate the attachment or the incorporation of the present plasmatron into an end use apparatus such as a plasma spray torch apparatus, a bore extension 18 may be provided, without in effect changing the functioning principle of the plasmatron. It is understood that although FIG. 1 indicates a bore 18 of a generally cylindrical shape, other types of bore 18 of a desired orientation, cross-section and length may be provided to further direct and shape the plasma stream 17 ejected from the anode electrode bore.

Figure 3:
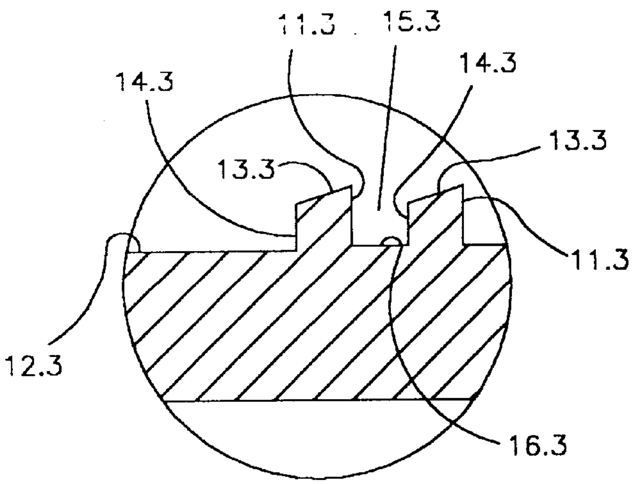
FIG. 3 is a scaled up view of the cross-sectional area within circle "B" in FIG. 1 showing an alternate embodiment of the anode wherein the rings adjacent to an arc root attachment surface have differing diameters.
Figure 4:
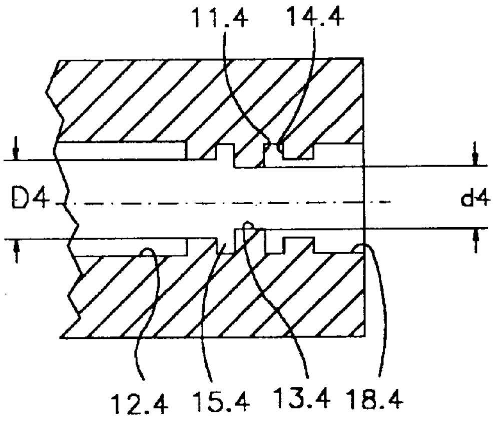
FIG. 4 is a front elevation view of an alternate embodiment of the anode electrode structure of the present invention, shown in cross-section, wherein the rings adjacent to a groove have differing diameters.

FIG. 3 shows schematically an alternate embodiment of anode electrode 24 as described with reference to FIG. 2 and numerical references include the added designation "0.3", and it should be understood that those references correspond to designated numerical references contained in FIG. 2 as described above, except as may be modified in this paragraph. In FIG. 3, at least one pair of rings 14.3 and 11.3 are shown having differing diameters, therefore defining an arc root attachment surface 13.3 of a frusto-conical shape;

FIG. 4 shows schematically an alternate embodiment of anode electrode 24 as described with reference to FIG. 1 and FIG. 2 and numerical references include the added designation “0.4”, and it should be understood that those references correspond to designated numerical references contained in FIG. 1 and FIG. 2 as described above, except as may be modified in this paragraph.

Referring back to FIG. 1 and FIG. 2, anode electrode 24 is shown comprising a plurality of surface 13 defined by ring members 11 and 14 having substantially equal diameters “D”. FIG. 4 shows one instance of an alternate preferred embodiment of the anode electrode wherein at least one surface 13.4 is defined by a pair two adjacent rings having a diameter “D4” smaller than the diameter “d4” of at least one other pair of such adjacent rings. This tends to enhance the prolonged attachment of the arc root on the smaller diameter surface 13.4, leading to improved anode performance, particularly when the velocity of the gas is reduced or the arc is further stretched. Preferably, the ratio of the diameters D4/d4 is in the range of about 1.25–1 to 1.

Figure 5:
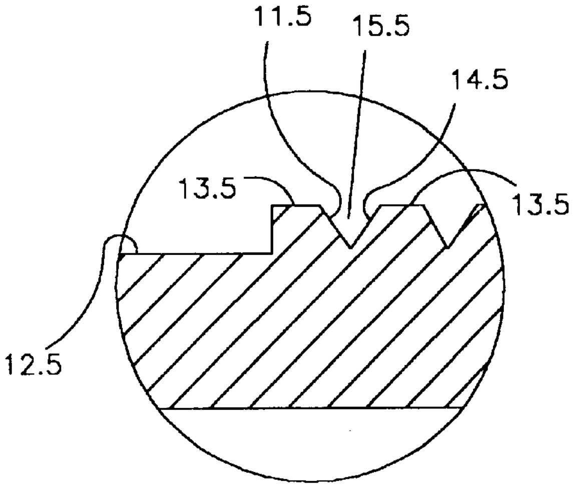
FIG. 5 is a scaled up view of the cross-sectional area within circle "B" in FIG. 1 showing another embodiment of the anode, wherein the groove is defined by two angled rings.

FIG. 5 shows an alternate design of the anode electrode as described with reference to FIG. 2 and numerical references include the added designation “0.5”, and it should be understood that those references correspond to designated numerical references contained in FIG. 2 as described above, except as may be modified in this paragraph. Adjacent ring members 11.5 and 14.5 are shown extending radially about the inner bore of the anode at an oblique angle.

Referring back to FIG. 1 it should be understood that the use of a throat 9 it is not essential for stabilizing the arc root attachment to the anode bore. Therefore if the arc chamber would be a constant cross-section flow expansion chamber extending from the cathode tip to the anode electrode 24, the plasmatron thereto would be superior to prior art plasmatrons, by providing an electric arc with the arc root 36 substantially confined to the arc root attachment surfaces 13, the plasmatron therefore functioning better and more stable than a plasmatron without a plurality of surfaces 13. The stretching and the transfer of the arc from the cathode tip to the anode bore after passing through a flow constrictor and a gas flow expansion chamber creates an elongated arc, which according to the $K_E$ criterion induces to higher arc voltages. However, it is known that in the case of long and constricted arcs the arc root attachment is highly unstable, leading to arc voltage ripples. By using the anode electrode structure of the present invention, the stability of the arc root attachment is highly improved and the voltage ripple is controlled.

The present plasmatron design was found to work stable for a very wide range of gas flows from as little as 40 l/min to as much as 300 l/min. As an example, prior art plasmatrons operating at low gas flows of about 40 l/min induce voltages of maximum about 80–100V and the arc root attachment is unstable leading to frequent voltage spikes, sometimes significantly higher than 10V. For the same low gas flows the present plasmatron achieves 100–150V with the arc root attachment fully stabilized to the anode bore while the arc voltage can be controlled to be less than 10V. For higher gas flows, in the range of 150–250 l/min, prior art plasmatrons achieve voltages generally between 100–200V with voltage variations of more than 5V. By contrast, for similar gas flow conditions, the present plasmatron is capable of achieving voltages of 200–300V with voltage variations of less than 5V. While in the prior art plasmatrons the voltage variations are unpredictable and uncontrollable, with the present plasmatron, the voltage variation is controlled by the width of grooves 15 and surfaces 13 shaped into the bore of anode 24. This is because the arc root will tend to jump over one groove 15 at any one time and therefore move only between two adjacent surfaces 13.

FIGS. 6A, 6B, 6C and 6D show schematically a selection of plasma spray torch configurations incorporating the plasmatron of the present invention. The increased ionization and the stabilized plasma stream generated by the plasmatron of the present invention provide for the application of improved plasma spray coatings.

Figure 6A:
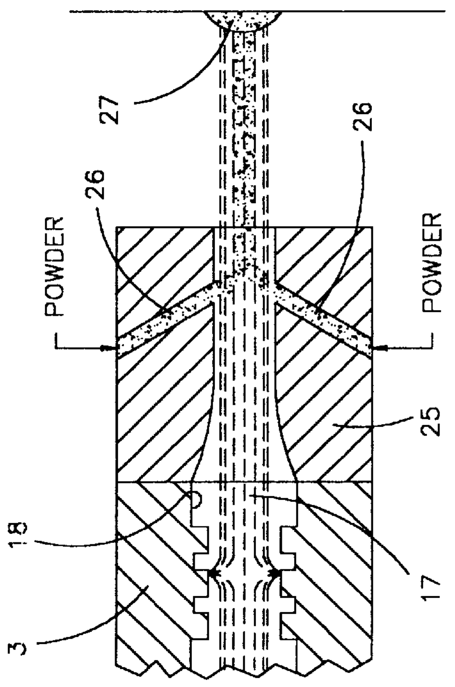
FIGS. 6A, 6B, 6C and 6D are schematic front elevation views in cross-section of the downstream end portion of a plasma spray torch employing the plasmatron of the present invention and showing a selection of alternate positions and angles for powder feed ducts, i.e.
Figure 6B:
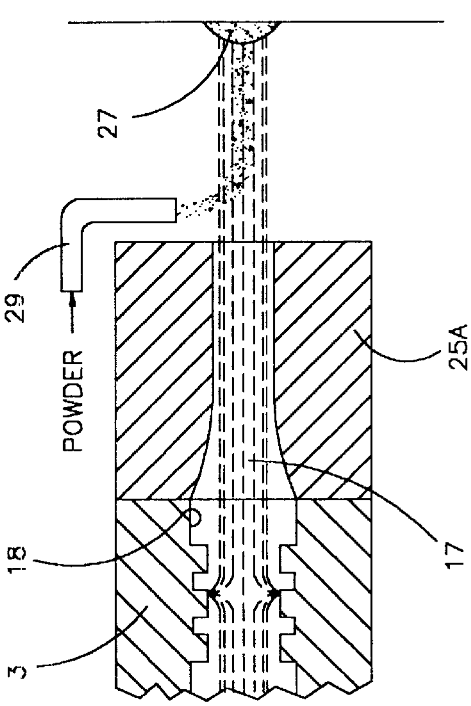
Figure 6C:
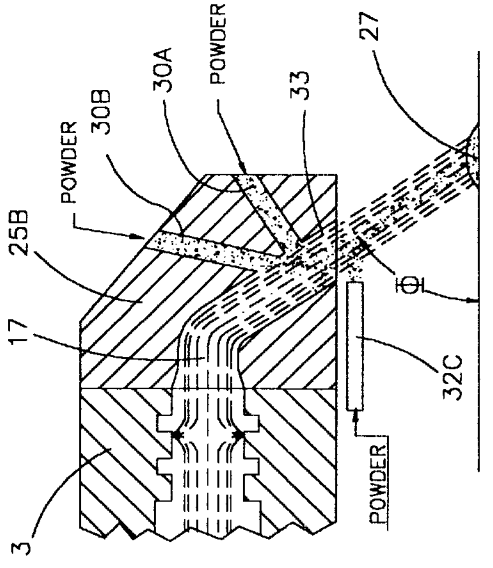
Figure 6D:
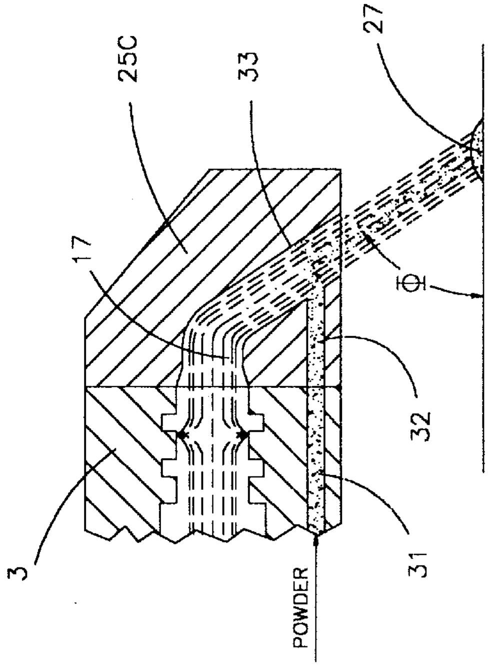

FIG. 6A shows the downstream end portion of a plasma torch shown schematically with the downstream end of the plasmatron 3 of the present invention attached to an in line output plasma nozzle 25 shaped to receive the plasma stream 17 discharged from the anode electrode bore and further comprising one or more feed ducts 26 provided in the body of nozzle 25, the ducts oriented in a direction generally towards the axis of the plasmatron and used for feeding powder material into the plasma stream 17. Further, the powder material is entrapped by the plasma stream and is impacted onto a surface to produce a plasma spray coating 27. FIG. 6B shows a somehow similar arrangement like in FIG. 6A with one powder feed duct 29 positioned now externally in front of the output of nozzle 25A. A plurality of ducts 26 or 29 may be organized around the circumference of the output plasma nozzle 25 or 25A, to feed spray material simultaneously. FIG. 6C shows the downstream end portion of a plasma torch shown schematically with the downstream end of the plasmatron 3 of the present invention attached to plasma nozzle 25B shaped to redirect the plasma stream 17 at an angle Φ away from the plasmatron axis. One or more feedstock ducts shown schematically at 30A, 30B or 32C are provided to introduce powder material into the redirected plasma stream in a direction generally towards the axis of the redirected plasma stream, to entrap the powder material into said redirected plasma stream and to impact the entrapped powder onto a surface to produce a plasma spray coating 27. Conventionally, the angle Φ is equal to or less than 90°. It would be readily understood that if desired, the powder feed duct may be positioned externally to the output of plasma nozzle 25B, in a fashion somehow similar to that shown in FIG. 6B. An alternate way of introducing powder material is schematically shown in FIG. 6D whereby the powder duct 31 runs internally through the plasmatron body, generally parallel to plasmatron axis. A duct 32 provided through the body opens at the internal wall of nozzle 25C. Duct 32 is shaped and positioned to receive powder material from duct 31 and to inject the powder material into the bore of nozzle 25C. The configurations shown in FIGS. 6C and 6D are of particular use for applying plasma spray coatings to internal surfaces and more particularly to such internal surfaces having a reduced cross-section or limited access.

It is understood that the anode and the plasmatron of the present invention can be successfully applied to other plasma spray torch configurations not described herein as well as to plasma torches intended for uses other than plasma spraying.

Having described the embodiments of the invention, modifications will be evident to those skilled in the art without departing from the scope and spirit of the invention as defined in the following claims.

I claim:

1. An anode electrode for a plasmatron having a cathode electrode located upstream of the anode, the anode electrode used to control the root attachment of an electric arc generated by the plasmatron, the anode comprising a plurality of arc root attachment surfaces defined on an inner surface of the anode by a plurality of ring members, each ring member extending radially about the inner surface of the anode, each pair of adjacent ring members defining a groove therebetween, the groove shaped radially into the inner surface of the anode, each groove being located between two adjacent arc root to attachment surfaces.

2. An anode electrode as described in claim 1 wherein the ring members have substantially equal diameters.

3. An anode electrode as described in claim 1 wherein at least one ring member has a lesser diameter than an adjacent ring member.

4. An anode electrode as described claim 3 wherein the ratio between the diameters of two adjacent ring members is maximum 1.25 to 1.

5. An anode electrode as described in claim 1 wherein the ratio between the width of an arc root attachment surface and the width of an adjacent groove is between 1–5 to 1.

6. An anode electrode as described in claim 2 wherein the ratio between the width of an arc root attachment surface and the width of an adjacent groove is between 1–5 to 1.

7. An anode electrode as described in claim 3 wherein the ratio between the width of an arc root attachment surface and the width of an adjacent groove is between 1–5 to 1.

8. An anode electrode as described in claim 4 wherein the ratio between the width of an arc root attachment surface and the width of an adjacent groove is between 1–5 to 1.

9. A plasmatron used to generate a plasma gas stream flowing between a cathode and an anode and comprising:

(a) an arc chamber having an axis and an inner wall defining a gas flow chamber;

(b) an anode electrode positioned axially at the downstream end of the gas flow chamber; the anode electrode used to control the root attachment of an electric arc generated by the plasmatron, the anode comprising a plurality of arc root attachment surfaces defined on an inner surface of the anode by a plurality of ring members, each ring member extending radially about the inner surface of the anode, each pair of adjacent ring members defining a groove therebetween, the groove shaped radially into the inner surface of the anode, each groove being located between two adjacent arc root attachment surfaces; and (d) a cathode electrode positioned axially at the upstream end of the arc chamber, spaced apart and electrically insulated from the arc chamber inner wall and from the anode electrode.

10. A plasmatron as described in claim 9 wherein the ring members have substantially equal diameters.

11. A plasmatron as described in claim 9 wherein at least one ring member has a lesser diameter than an adjacent ring member.

12. A plasmatron as described in claim 11 wherein the ratio between the diameters of two adjacent ring members is maximum 1.25 to 1.

13. A plasmatron as described in claim 9 wherein the ratio between the width of an arc root attachment surface and the width of an adjacent groove is between 1–5 to 1.

14. A plasmatron as described in claim 10 wherein the ratio between the width of an arc root attachment surface and the width of an adjacent groove is between 1–5 to 1.

15. A plasmatron as described in claim 11 wherein the ratio between the width of an arc root attachment surface and the width of an adjacent groove is between 1–5 to 1.

16. A plasmatron as described in claim 12 wherein the ratio between the width of an arc root attachment surface and the width of an adjacent groove is between 1–5 to 1.

* * * * *